Oct. 10, 1933.    H. O. HALL    1,930,168
PORTABLE SAW TABLE
Filed March 21, 1933    3 Sheets-Sheet 2
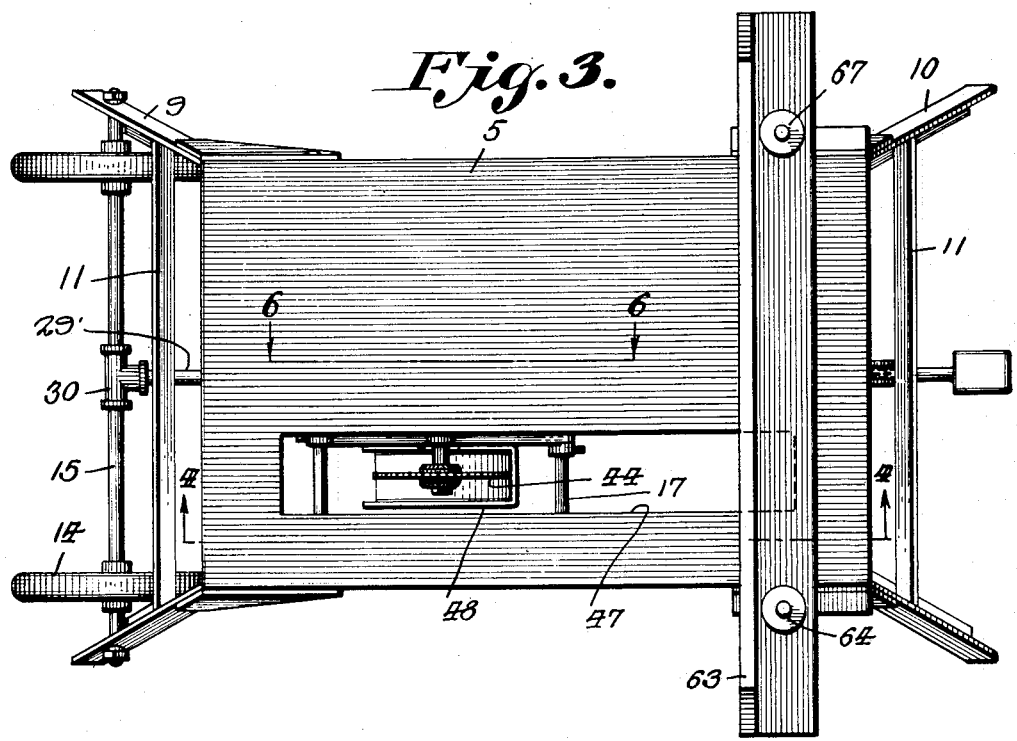
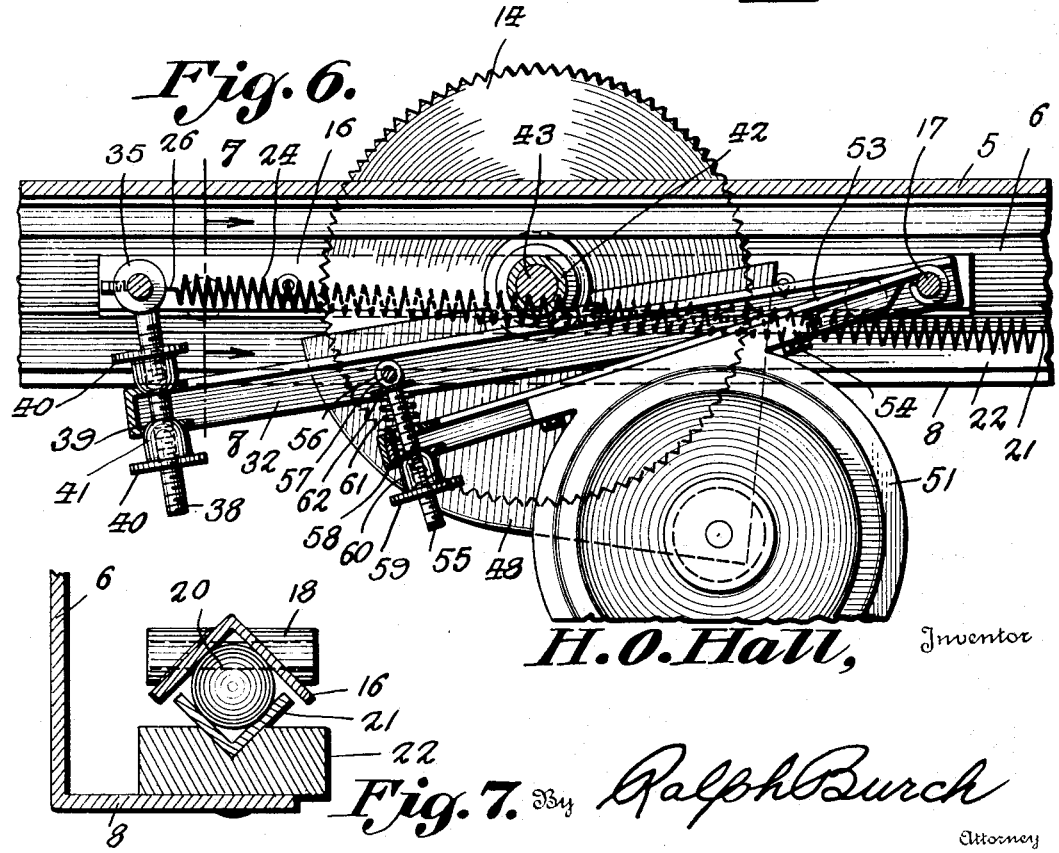
H. O. Hall, Inventor
By Ralph Burch
Attorney

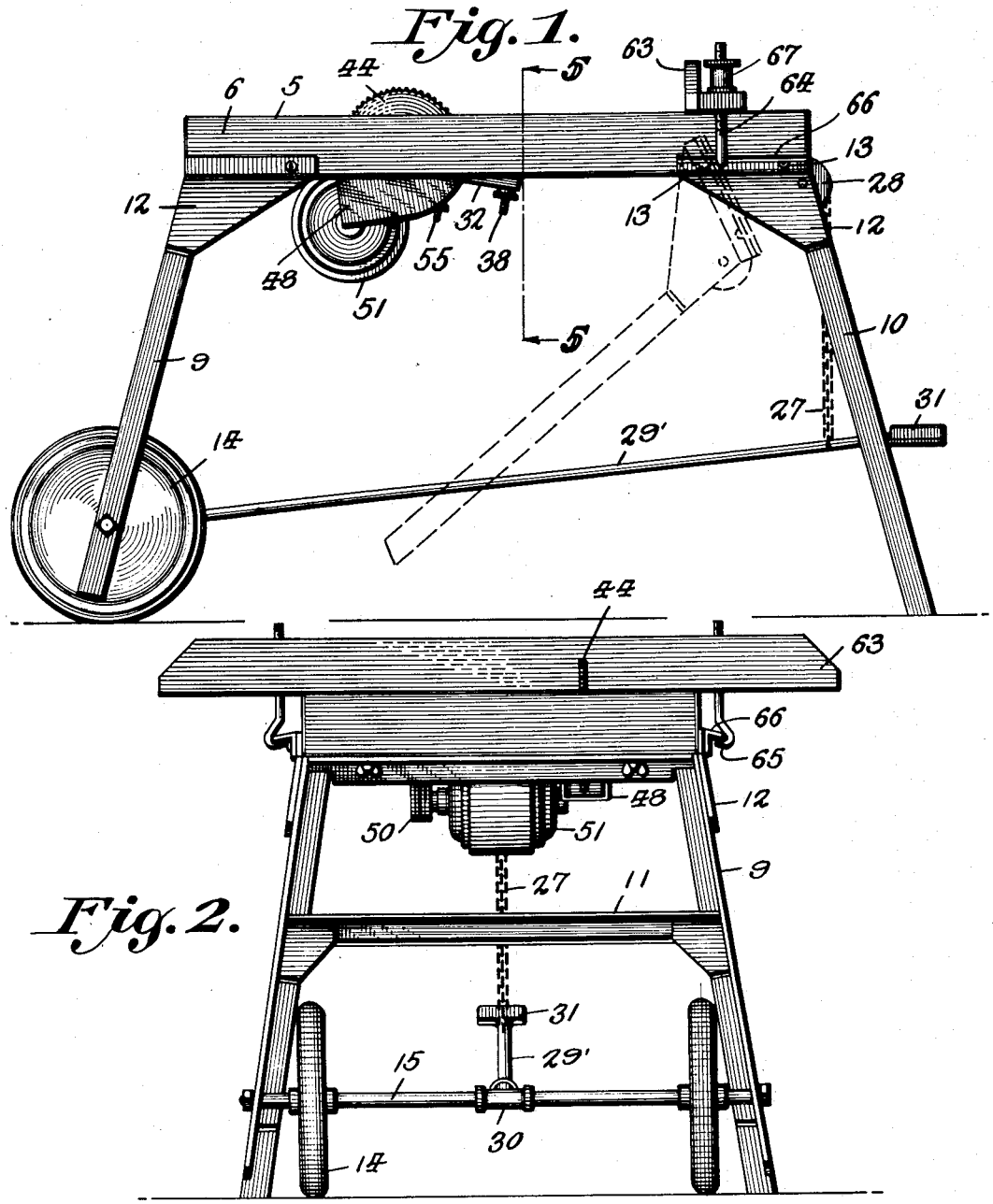

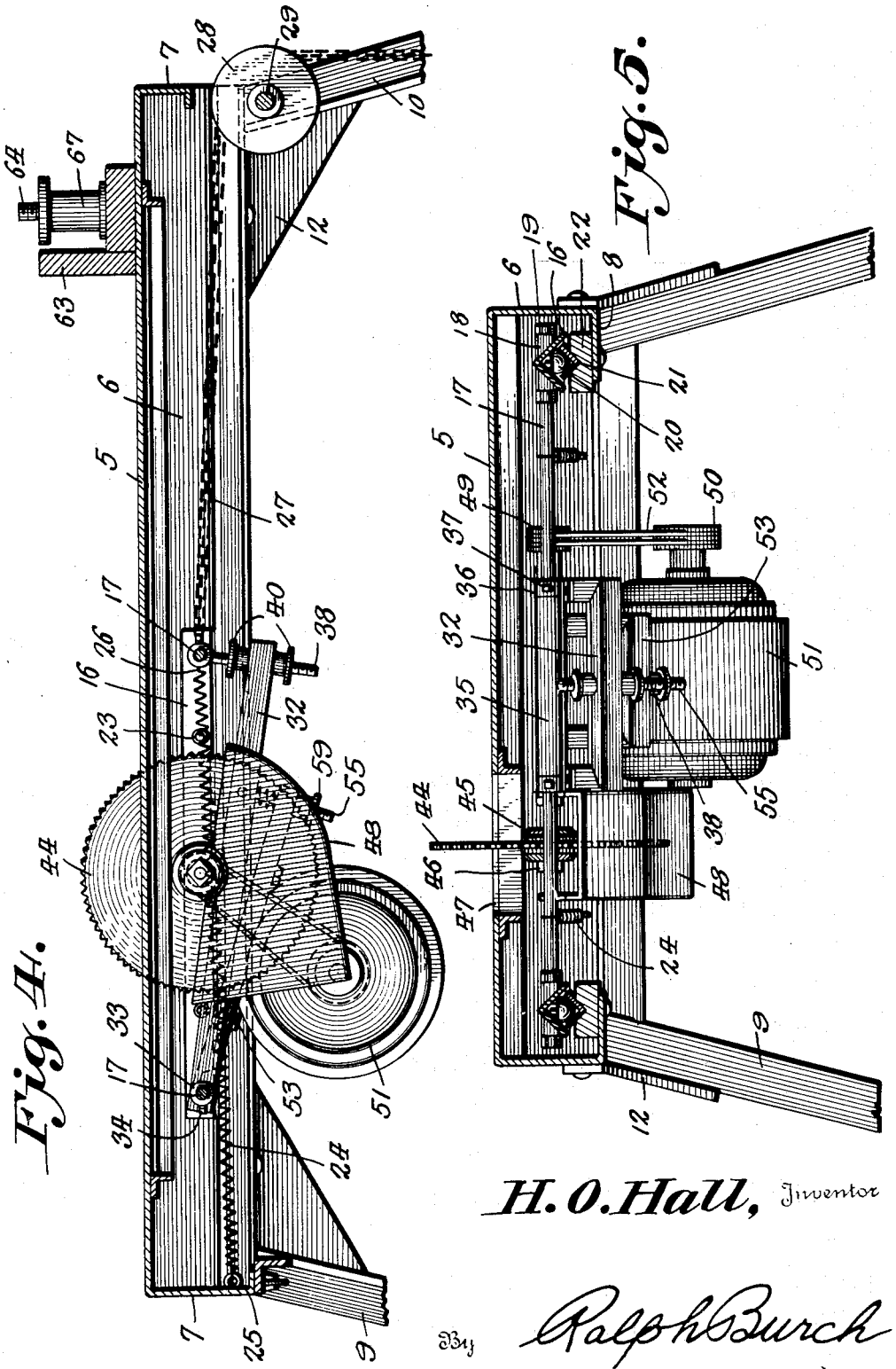

Patented Oct. 10, 1933

1,930,168

UNITED STATES PATENT OFFICE 1,930,168

PORTABLE SAW TABLE

Harry O. Hall, Murray, Utah

Application March 21, 1933. Serial No. 661,985

4 Claims. (Cl. 143—47)

My invention relates to portable saw tables.

The primary object of the invention is to provide a portable saw table having a movable saw supporting carriage adapted to move the saw longitudinally of the table in a straight line, to bring the saw into engagement with the work.

A further object of the invention is to provide a movable saw carriage adapted to support a motor driven saw, the supporting means for the saw and motor being capable of independent adjustment.

A still further object of the invention is to provide a movable saw carriage having means for moving the carriage forward and backward along the table.

Another object of the invention is to provide a device of the above-mentioned character which is simple and durable in construction, reliable and efficient in operation and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation view of the table, Fig. 2 is a front view of the same, Fig. 3 is a top plan view of the same, Fig. 4 is a longitudinal sectional view taken on lines 4—4 of Fig. 3, Fig. 5 is a transverse section taken on lines 5—5 of Fig. 1, Fig. 6 is an enlarged longitudinal section taken on lines 6—6 of Fig. 3, and, Fig. 7 is a cross section taken on lines 7—7 of Fig. 6.

In the drawings, wherein for the purpose of illustration, I have shown a preferred embodiment of my invention, the numeral 5, denotes the top of the table, which is formed of sheet metal, having its edges bent downwardly to provide side and end walls 6 and 7, the lower edges of the side walls being bent to provide inwardly directed flanges 8. The top is supported by front and rear legs 9 and 10, extending downwardly from the corners of the top, in diverging relation to each other, and each set of legs are suitably braced by cross bars 11. The upper ends of the legs are connected to the side walls 6, of the top by gussets 12, the gussets of the rear legs being attached to the side walls by bolts 13 and one of the bolts acts as a pivot, to permit folding of the legs, as shown in dotted lines in Fig. 1, when the other bolt is removed. The front legs 9, are supported by wheels 14, journaled on an axle 15, extending between the front legs, which permit the table to be easily moved from place to place.

The movable saw carriage consists of a pair of parallel inverted V-shape angle bars 16, connected together adjacent each end by cross bolts 17, which extend through bushings 18, formed integral with the bars and nuts 19 threaded on the bolts on opposite sides of the bars, permit the bars to be laterally adjusted. The bars are supported at each end by ball bearings 20, which travel in V-shape tracks 21, extending the length of the table, the tracks being mounted on the top of rails 22, supported by the flanges 8. The ball bearings 20 are confined between the bolts 17, and lugs 23, which project inwardly from the walls of the bars 16, in spaced relation to the bolts, which permit the balls to roll freely when the carriage is moved. The carriage is normally held at the forward end of the table, by coil springs 24, one end of which is attached to the end wall of the top, as at 25, and their opposite ends attached to the cross bolt 17, of the carriage, as at 26. The carriage is moved rearwardly of the table by a chain 27, attached at one end to the bolt 17 of the carriage and the chain is trained over a pulley 28, journaled on a shaft 29, extending between the rear legs of the table having its opposite end attached to a foot lever 29'. The foot lever is pivotally mounted on the axle 15, as at 30, and extends longitudinally of the table having its free end provided with a foot pedal 31, for actuating the lever to pull the chain whereby the carriage is moved towards the rear of the table.

The saw supporting frame 32 is rectangular shape and formed of angle iron. The frame at one end is pivotally mounted on one of the bolts 17 of the carriage and is held against side movement by collars 33 mounted on the bolt on opposite sides of the frame. The collars 33 are adjustably secured upon the bolts by set screws 34, which permit the frame to be laterally adjusted on the bolt of the carriage. The bolt 17, at the opposite end of the carriage has a sleeve 35 journaled thereon, which is held in place by collars 36 secured on the bolt by set screws 37. A threaded stem 38, depends from the center of the sleeve 35 and is adapted to extend through openings 39, in the end member of the frame. A pair of clamping nuts 40 are threaded on the stem on opposite sides of the frame and have rounded bosses 41 adapted to seat in the openings 39, thus rigidly clamping the frame on the stem in its adjusted position. A bearing 42 is mounted on top of the frame 32 and extends transversely thereof, intermediate its ends. An arbor 43 is journaled in the bearings 42 and projects beyond both ends thereof. A circular saw 44, is mounted on one end of the arbor and is fixedly secured thereon by locking collars 45, held in clamping engagement with the saw by nut 46. The circular saw projects through an elongated slot 47, formed in the top 5 of the table and a shield 48 attached to the side of the frame 32 is disposed around the lower half of the saw. A drive pulley 49 is keyed on the opposite end of the arbor and is connected with a pulley 50 mounted on the shaft of the electric motor 51, by endless belts 52. The base of the motor is attached to the underside of the supporting frame 53, by bolts 54. The frame 53 is disposed within the frame 32, having one end pivotally mounted on the bolt 17, which also supports the frame 32. The frame 53 is shorter than the frame 32 and has its free end supported by a bolt 55 depending from a sleeve 56, journaled on a rod 57, extending transversely of the frame 32. The bolt 55 extends through openings 58 in the end member of the frame 53, and threaded on the lower end of the bolt is a clamping nut 59 having a rounded boss 60, adapted to seat in the lower opening in the end member. A coil spring 61 is mounted on the upper portion of the bolt 55, between a washer 62 and the end member of the frame, which yieldably sustains the motor frame in its adjusted position.

Mounted on the top 5, of the table adjacent its rear end and extending transversely thereof, is a work fence 63, which projects beyond each side of the table. The fence is secured to the top in its adjusted position, by bolts 64, depending from each end, having hooks 65 at their lower ends adapted to engage beneath flanges 66 extending laterally from the gussets 12. The upper ends of the bolts 64 are provided with nuts 67, for clamping the bolts in tight engagement with the flanges 66.

In use, the table provides a strong and sturdy work bench which may be easily moved from place to place. The movable saw carriage is mounted to freely move longitudinally of the table in a straight line and is moved into engagement with the piece of work held in position by the work fence, when the lever 29' is depressed by the foot. Upon release of the foot lever the carriage is quickly returned to its normal position by the tension of the coil springs 24. The saw supporting frame 32 is adjustably mounted so as to permit the saw to be raised or lowered and is also capable of lateral adjustment, so that the saw may be centered in the slot 47. The motor supporting frame 53 moves with the frame 32 and is also capable of independent adjustment to tighten the belts connecting the motor pulley with the drive pulley of the saw arbor. While I have shown a saw mounted on the arbor, it is apparent that other similar tools may be used in place of the saw.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A saw table comprising a frame, a top supported by said frame provided with a longitudinal slot, a traveling carriage movable longitudinally beneath said top, a cross bar at each end of said carriage, a rectangular saw frame having one end pivotally mounted on one of said cross bars and capable of lateral adjustment, a sleeve pivotally mounted on the other cross bar and capable of lateral adjustment having a stem depending therefrom adapted to extend through an opening in the free end of said saw frame, nuts threaded on said stem above and below said saw frame having rounded bosses adapted to seat in the opening of the frame for securing the frame in its adjusted position, an arbor journaled on said saw frame, a circular saw mounted on said arbor adapted to extend through the slot in said top and a motor having driving connection with said arbor.

2. A saw table comprising a frame, a top supported by said frame provided with a longitudinal slot, a traveling carriage mounted beneath said top and movable longitudinally thereof, a cross bar at each end of said carriage, a rectangular saw frame having one end pivotally and adjustably mounted on one of said cross bars, a sleeve pivotally and adjustably mounted on the other cross bar having a stem depending therefrom adapted to extend through an opening in the free end of said saw frame, nuts threaded on said stem above and below said saw frame for securing the frame in its adjusted position, an arbor journaled on said saw frame, a circular saw mounted on said arbor adapted to extend through the slot in said top, a motor frame disposed beneath said saw frame having one end pivotally mounted on one of said cross bars, a bolt depending from said saw frame adapted to extend through openings in the free end of said motor frame, a nut threaded on the lower end of said bolt, a spring mounted on said bolt above said motor frame yieldably holding said frame in its adjusted position and a motor mounted on said motor frame having driving connection with said arbor.

3. A saw table comprising a frame, a traveling carriage mounted on said frame, a rectangular saw frame having one end pivotally connected to said carriage, means adjustably suspending the free end of said saw frame from said carriage, capable of fixedly securing the saw frame in its adjusted position, an arbor journaled on said saw frame, a circular saw mounted on said arbor, a motor frame disposed beneath said saw frame having one end pivotally connected to said carriage, adjusting means suspending the free end of said motor frame from said saw frame, cushioning means mounted on said motor frame adjusting means yieldably maintaining the motor frame in its adjusted position and a motor mounted on said motor frame having driving connection with said arbor.

4. A saw table comprising a frame, a traveling carriage mounted on said frame, a rectangular saw frame having one end pivotally connected to said carriage, means adjustably suspending the free end of said saw frame from said carriage, capable of fixedly securing the saw frame in its adjusted position, an arbor journaled on said saw frame, a circular saw mounted on said arbor, a motor frame disposed beneath said saw frame having one end pivotally connected to said carriage, a bolt depending from said saw frame adapted to pass through openings in the free end of said motor frame, a nut threaded on the lower end of said bolt, a cushioning spring mounted on said bolt above said motor frame yieldably holding said frame in its adjusted position and a motor mounted on said motor frame having driving connection with said arbor.

HARRY O. HALL.